(12) United States Patent
Supinski

(10) Patent No.: US 10,047,228 B1
(45) Date of Patent: Aug. 14, 2018

(54) WATERPROOF COMPOSITION

(71) Applicant: James Joseph Supinski, Wyoming, PA (US)

(72) Inventor: James Joseph Supinski, Wyoming, PA (US)

(73) Assignee: UNITED GILSONITE LABORATORIES, Scranton, PA (US)

( * ) Notice: Subject to any disclaimer, the term of this patent is extended or adjusted under 35 U.S.C. 154(b) by 0 days.

(21) Appl. No.: 14/563,538

(22) Filed: Dec. 8, 2014

Related U.S. Application Data

(60) Provisional application No. 61/913,672, filed on Dec. 9, 2013.

(51) Int. Cl.
*C09D 5/16* (2006.01)
*B32B 27/30* (2006.01)
*C09D 5/00* (2006.01)
*C09D 5/14* (2006.01)

(52) U.S. Cl.
CPC .............. *C09D 5/00* (2013.01); *C09D 5/14* (2013.01)

(58) Field of Classification Search
None
See application file for complete search history.

(56) References Cited

U.S. PATENT DOCUMENTS

| | | | | |
|---|---|---|---|---|
| 5,676,742 | A * | 10/1997 | Arendt | A01N 37/36 106/15.05 |
| 6,864,395 | B2 * | 3/2005 | Lassila | C08G 65/2609 568/606 |
| 2002/0165313 | A1 * | 11/2002 | Tanzer et al. | 524/589 |
| 2007/0248837 | A1 * | 10/2007 | Hsu et al. | 428/522 |
| 2012/0082791 | A1 * | 4/2012 | Liversage | 427/282 |
| 2012/0234490 | A1 * | 9/2012 | Daniels et al. | 156/332 |
| 2015/0119490 | A1 * | 4/2015 | Krishnan et al. | 523/122 |

OTHER PUBLICATIONS

Sci-Finder Information Sheet for Sag® Silicone Antifoam 47, Sci-Finder, p. 1-8.*
Product Information Sheet for DOW DALPAD A, DOW, Mar. 2004, p. 1-2.*

* cited by examiner

*Primary Examiner* — Robert T Butcher
(74) *Attorney, Agent, or Firm* — Steptoe & Johnson LLP

(57) ABSTRACT

A waterproof composition can include an acrylate polymer, a surfactant, a carbamate, a biocide, a coalescing agent, a siloxane, and a plasticizer, and, optionally, one or more of a defoamer, a thickener or a ultraviolet stabilizer.

14 Claims, No Drawings

WATERPROOF COMPOSITION

PRIORITY CLAIM

This application claims priority to U.S. Provisional Application No. 61/913,672, filed Dec. 9, 2013, which is incorporated by reference in its entirety.

FIELD OF THE INVENTION

The invention relates to a clear, unpigmented composition for waterproofing surfaces.

BACKGROUND

Leakage and waterproofing of walls and other retaining structures have been a problem in many areas. A structure can be waterproofed by using coatings to protect contents underneath or within as well as protecting structural integrity. Such a waterproof coating can include organic materials.

SUMMARY

In one aspect, a waterproof composition can include an acrylate polymer, a surfactant, a carbamate, a biocide, a coalescing agent, a siloxane, and a plasticizer, and, optionally, one or more of a defoamer, a thickener or a ultraviolet stabilizer. The acrylate polymer can include a styrene acrylic acid or an acrylic polymer. The surfactant can include a central hydrophilic moiety blocked by two hydrophobic ends. The surfactant can include a nonionic acetylenic diol.

In certain embodiments, the carbamate can include 3-Iodo-2-propynyl butyl carbamate. The biocide can include a derivative of an isothiazolinone or zinc omadine. The derivative of the isothiazolinone can include 1,2-benzisothiazolin-3-one.

In certain embodiments, the coalescing agent can include a glycol ether. The glycol ether can include an aromatic glycol ether. The siloxane can include a polysiloxane. The siloxane can include a polyether siloxane.

In certain embodiments, the plasticizer can include a benzoate ester. The benzoate ester can include a glycol benzoate. The glycol benzoate can include a dipropylene glycol dibenzoate. The glycol benzoate can include a diethylene glycol dibenzoate.

In certain embodiments, the waterproof composition can include a thickener. The thickener can include a propylene glycol.

In another aspect, a method of waterproofing a surface can include applying a composition that includes an acrylate polymer, a surfactant, a carbamate, a biocide, a coalescing agent, a siloxane, and a plasticizer to the surface. The composition applied to the surface can block water from passing through the surface.

Other aspects, embodiments, and features will be apparent from the following description, the drawings, and the claims.

DETAILED DESCRIPTION

A waterproof composition can include an acrylate polymer, a surfactant, a carbamate, a biocide, a coalescing agent, a siloxane, and a plasticizer. The composition can stop wind driven rain; it can be used as vapor retarder and/or moisture barrier; it can have high gloss; it can have excellent abrasion resistance, withstanding hydrostatic pressure according to ASTM D-7088; it can have low odor. For example, a water proof composition can include a styrene acrylic resin or acrylic resin; an acetylenic diol, a fungicide; and a blend of dipropylene glycol dibenzoate and diethylene glycol dibenzoate. The composition can be clear or unpigmented.

In one example, a water proof composition can include Aquamac 570 (PCCR) styrene acrylic resin or EPS 2257 (EPS) 100% acrylic; Surfynol 104DPM (Air Products), acetylenic diol low foam wetting agent in DPM 1:1 ratio; fungitrol 940—mildewcide/fungicide (ISP); promex 20D—stabilizer (PROM); DPM—a coalescing agent (Nexeo); DpNB—a coalescing agent(Nexeo); Foamex 1488 that includes polysiloxane emulsion defoamer containing fumed silica, or Foamex 805 that includes non-silica containing (Tego) or modified silicone defoamer (Alzo); water; KFlex500—a plasticizer that can include a blend of dipropylene glycol dibenzoate and diethylene glycol dibenzoate at a 1:1 ratio (Nexeo); and Acrysol RM 8W—HUER thickener (Dow), or RM-8 (Dow). The composition can include a UV inhibitor, such as Tinuvin 292 UV (Ciba).

An acrylate polymer includes a polymer made from acrylic acid. An acrylate polymer can include a 100% acrylic polymer or a styrene acrylic acid polymer. A surfactant is a compound that lowers the surface tension (or interfacial tension) between two liquids or between a liquid and a solid. A surfactant can include a central hydrophilic moiety blocked by two hydrophobic ends. The surfactant can include a nonionic acetylenic diol. An aqueous solution including one or more acetylenic diol type surfactants can be used to improve the wettability of a substrate surface by lowering the contact angle of the aqueous solution.

Carbamates are organic compounds derived from carbamic acid ($NH_2COOH$). A carbamate in a waterproof composition can include 3-Iodo-2-propynyl butyl carbamate.

A waterproof composition can include a mildewcide, a fungicide, or a biocide. A biocide can include a derivative of an isothiazolinone, which can be methylisothiazolinone, chloromethylisothiazolinone, 1 2-benzisothiazolin-3-one, octylisothiazolinone, or dichlorooctylisothiazolinone or zinc omadine. A coalescing agent can assist in film formation. An example of a coalescing agent is a glycol ether, which can be an aromatic glycol ether.

A waterproof composition can include a siloxane, which can be a polysiloxane. The siloxane can include a polyether siloxane. The waterproof composition can include a plasticizer, which can be a benzoate ester. The benzoate ester includes a glycol benzoate, such as a dipropylene glycol dibenzoate, a diethylene glycol dibenzoate, 2-ethyl hexyl monobenzoate, or modified dibenzoate, or a mixture thereof. In addition, the waterproof composition can include a thickener, which can include a propylene glycol.

A UV stabilizer can include Tinuvin 292, a liquid hindered amine light stabilizer.

A defoamer can be a silicone-based defoamer.

A thickener can be a water-based HUER composition.

The composition can waterproof interior walls, for example, holding back 5 psi. When used for exterior walls, it can block wind driven rain penetration per ASTM D-6904. The composition can be applied on masonry floors as barrier, which can have a perm rating of 0.97 after 2 coats at 18 mil total dry film thickness. In addition to be used as a barrier, it can also be applied to masonry floors as a top coat, which can give high gloss finish. The composition can also be applied on the exterior of wood, which can function as a primer coat to extend the life of wood. Additionally, the composition can be used for bird baths, pools, etc.

A method of waterproofing a surface can include applying a composition that includes an acrylate polymer, a surfactant, a carbamate, a biocide, a coalescing agent, a siloxane, and a plasticizer to the surface. The composition applied to the surface can block water from passing through the surface.

EXAMPLE

In one example, 11.83 gallons of water, 1.10 gallons of Surfynol 104 DPM and 0.78 gallon DPM were mixed for 10 minutes to form a first mixture. Add 70.37 gallons of EPS 2257 and 2.65 gallons BENZO50/KFLEX500 to the first mixture to form a second mixture. Use Aquamac 570 Latex. Premix 13.17 gallons of water and 2.08 gallons of Dowanol DPnB for 5 minutes to add to the second mixture. To the second mixture, add 0.22 gallon of NUO498/ROCIMA BT NV2/PROMEX 20D and 0.32 gallon of FOAMEX 1488 and mix for 10 minutes to form a third mixture. Add 0.32 gallon of Promex IPBC40/FUNTITROL 940 to the third mixture and mix for 5 minutes to form a fourth mixture. Add 1.84 gallons of RM 8W slowly to the fourth mixture and adjust height and speed of blade for viscosity as needed. Mix the materials for a minimum of 20 minutes until uniform.

In another example, 11.83 gallons of water, 1.10 gallons of Surfynol 104 DPM and 0.78 gallon DPM were mixed for 10 minutes to form a first mixture. Add 70.37 gallons of EPS 2257 to the first mixture to form a second mixture. Premix 13.17 gallons of water and 2.08 gallons of Dowanol DPnB for 5 minutes to add to the second mixture. To the second mixture, add 0.22 gallon of NUO498/ROCIMA BT NV2/PROMEX 20D and 0.32 gallon of FOAMEX 1488 and mix for 10 minutes to form a third mixture. Add 0.32 gallon of Promex IPBC40/FUNTITROL 940 to the third mixture and 0.53 gallons of Tinuvin 292 and mix for 5 minutes to form a fourth mixture. Add 1.84 gallons of RM 8W slowly to the fourth mixture and adjust height and speed of blade for viscosity as needed. Mix the materials for a minimum of 20 minutes until uniform.

Other embodiments are within the scope of the following claims.

What is claimed is:

1. A waterproof composition consisting essentially of an acryiate polymer, a surfactant including a nonionic acetylenic diol, a carbamate, a biocide, a coalescing agent including a glycol ether, a siloxane, a dipropyiene glycol dibenzoate, a diethylene glycol dibenzoate, a plasticizer, and a material selected from the group consisting of a defoarner, a thickener and an ultraviolet stabilizer, wherein a weight ratio between the dipropyiene glycol dibenzoate and the diethylene glycol dibenzoate is 1:1, wherein the biocide includes a derivative of an isothiazolinone or zinc omadine, and the plasticizer includes a benzoate ester and withstanding hydrostatic pressure according to ASTM D7088.

2. The waterproof composition of claim 1, wherein the acrylate polymer includes an acrylic acid polymer.

3. The waterproof composition of claim 1, wherein the acrylate polymer includes a styrene acrylic acid polymer.

4. The waterproof composition of claim 1, wherein the surfactant further includes a central hydrophilic moiety blocked by two hydrophobic ends.

5. The waterproof composition of claim 1, wherein the carbamate includes 3-Iodo-2-propynyl butyl carbamate.

6. The waterproof composition of claim 1, wherein the derivative of the isothiazolinone includes 1,2-benzisothiazolin-3-one.

7. The waterproof composition of claim 1, wherein the glycol ether includes an aromatic glycol ether.

8. The waterproof composition of claim 1, wherein the siloxane includes a polysiloxane.

9. The waterproof composition of claim 1, wherein the siloxane includes a polyether siloxane.

10. The waterproof composition of claim 1, wherein the benzoate ester includes a glycol benzoate.

11. The waterproof composition of claim 1 further comprising a thickener.

12. The waterproof composition of claim 11, wherein the thickener includes a propylene glycol.

13. A method of waterproofing a surface comprising applying a composition consisting essentially of an acrylate polymer, a surfactant including a nonionic acetylenic diol, a carbamate, a biocide, a coalescing agent including a glycol ether, a siloxane, a dipropylene glycol dibenzoate, a diethylene glycol dibenzoate, a plasticizer, and a material selected from the group consisting of a defoamer, a thickener and an ultraviolet stabilizer, wherein a weight ratio between the dipropylene glycol dibenzoate and the diethylene glycol dibenzoate is 1:1, wherein the biocide includes a derivative of an isothiazolinone or zinc omadine, and the lasticizer includes a benzoate ester, and withstanding hydrostatic pressure according to ASTM D-7088.

14. The method of claim 13, wherein the composition applied to the surface blocks water from passing through the surface.

* * * * *